Sept. 13, 1955  J. A. RUTH  2,717,903
NITRATION OF GLYCERINE
Filed May 26, 1950  3 Sheets-Sheet 1

INVENTOR:
JOHN A. RUTH
BY [signature]
ATTORNEYS.

Sept. 13, 1955   J. A. RUTH   2,717,903
NITRATION OF GLYCERINE
Filed May 26, 1950   3 Sheets-Sheet 2

INVENTOR:
JOHN A. RUTH
BY
ATTORNEYS.

Sept. 13, 1955 J. A. RUTH 2,717,903
NITRATION OF GLYCERINE
Filed May 26, 1950 3 Sheets-Sheet 3

INVENTOR:
JOHN A. RUTH

ATTORNEYS.

United States Patent Office 2,717,903
Patented Sept. 13, 1955

2,717,903

NITRATION OF GLYCERINE

John A. Ruth, Alton, Ill., assignor to Olin Mathieson Chemical Corporation, a corporation of Virginia Application May 26, 1950, Serial No. 164,417

3 Claims. (Cl. 260—467)

This invention relates generally to a continuous process of carrying out substantially instantaneous chemical reactions as exemplified by the process of manufacturing nitroglycerine.

In the chemical arts, there are numerous processes wherein the raw constituents react almost instantaneously, but wherein the reaction products are either unstable or otherwise in unfavorable equilibrium, so that the efficiency of the process is reduced when the reaction products are permitted to remain long in contact with each other. Such a reaction is typified by the process of manufacturing nitroglycerine wherein glycerine is contacted with nitric acid in the presence of a dehydrating agent. Although the nitration of the glycerine takes place almost instantaneously, with the production of water as a by-product, the reaction mixture is unstable in that, in the presence of acid, the nitroglycerine tends to decompose, thus creating a hazardous condition with both incendiary and explosive propensities. Furthermore, the tendency of the nitroglycerine to decompose is accentuated as the temperature of the mixture increases, so that, unless the temperatures of the mixture are maintained at or below 20° C., it has heretofore been recognized that uneconomic yields of nitroglycerine would be produced.

While continuous processes of nitrating glycerine have heretofore been proposed, the ultimate yields of such processes have been unfavorable and their operation has involved serious hazard despite efforts to cool the reaction vessel. Not only for safety, but in an effort to improve the yield of both batch processes and continuous processes of nitrating glycerine, the prior workers in the art have taken great pains to maintain a low reaction temperature, but in all such prior art processes, the products of reaction are maintained in contact with each other for long periods of time (amounting in the case of batch processes to one to two hours, and amounting in the case of continuous processes to at least twenty minutes) and in substantial volume. This latter, I have discovered, constitutes not only a hazard, but reduces the yield.

The object of the present invention, generally stated, is to provide a process of carrying out such instantaneous chemical reactions wherein the reaction products are unstable in the presence of one or more of the components of the reaction mixture, so as to produce a high yield of the desired reaction product and an efficiency of operation.

More specifically, the object of the present invention is to provide a process of manufacturing nitroglycerine, which is continuous, safe, efficient, and productive of high yields.

Other objects will become apparent to those skilled in the art when the following description is read in connection with the accompanying drawings, in which.

Figure 1:
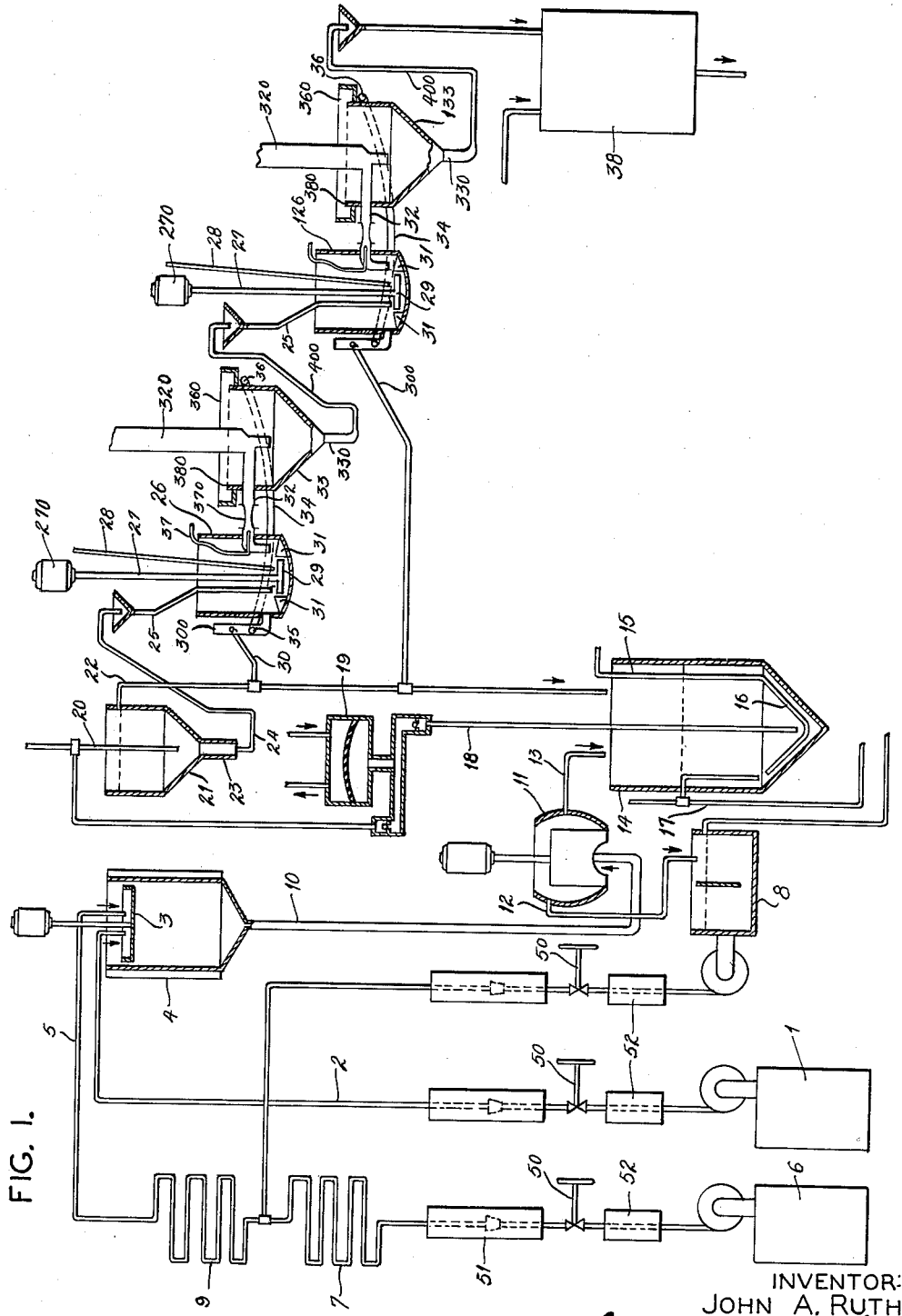
Figure 1 is a flow sheet indicating the several stages of the process as applied to the manufacture of nitroglycerine.

The present invention is predicated upon the discovery that, in reactions of the character typified by the nitration of glycerine, higher temperatures than those commonly employed may be tolerated without deleterious effect if the reaction products, while in contact with each other, be prevented from accumulating in substantial quantities, and if the reaction products be separated from each other immediately after initial contact of the reactants. By "immediately separating" the reaction products is meant separating the reaction products sequentially as they are formed, with no intermediate collection or aggregation of the products.

The invention is predicated upon the further discovery that highly exothermic reactions such as the nitration of glycerine can be conducted on a non-refrigerated surface, without deleterious effect, if the reactants be intermixed with a compatible substance which by virtue of its heat capacity lowers the temperature of the reaction mixture. Such a substance may be termed a "heat ballast." As regards the nitration of glycerine, a desirable heat ballast is the spent acid resulting from previous nitrations. With approximately equal parts of fresh and spent acid, the temperature of nitration may be as high as 60° C. without deleterious effect or creating an unduly hazardous condition. Indeed, the process of the present invention may be operated with nitration temperatures higher than 60° C., provided only that the temperature is not so high that oxides of nitrogen are evolved at the locus of reaction.

As illustrating the application of the invention to the manufacture of nitroglycerine, the acid (which usually consists of a mixture of sulphuric acid and nitric acid) may be employed in the same ratio to glycerine as in the conventional processes of manufacturing nitroglycerine by either the batch or continuous processes. It is preferred, however, to utilize, in lieu of the ordinary acid mixture, a mixture of spent acid (resulting from previous nitrations) reinforced by the addition of a mixture of fresh sulphuric and nitric acids. A typical example of such a spent acid is constituted as follows:

74.9% sulphuric acid,
7.85% nitric acid,
17.25% water, and in addition contains on the order of 2.5% dissolved nitroglycerine. To 382 pounds of such spent acid may be added 378 pounds of an acid mixture composed as follows:

42.3% $H_2SO_4$
6.7% $SO_3$
51.0% $HNO_3$

The resulting 760 pounds of acid mixture is sufficient for the nitration of 84.5 (±2%) pounds of glycerine, in accordance with the present invention. The acid mixture is preferably precooled to a temperature between +10° C. and −10° C., the lower temperatures being maintained when it is desired to lower the temperature of reaction.

The precooled acid mixture is contacted with glycerine as by concurrently introducing small streams thereof onto a surface upon which they are thoroughly mixed, the reaction, as aforesaid, taking place practically instantaneously. The reaction mixture is immediately discharged from the reaction locus with no more delay than is necessary to obtain contact of the acid with substantially all the glycerine. An apparatus suitable for effecting such contact of the reactants is disclosed in the copending application of Frederick R. Seavey, Serial No. 164,358, filed of even date herewith, now Patent No. 2,688,715 and involves essentially a spinning disc having a peripheral flange, or being otherwise conformed so as to assure thorough and immediate mixture of the liquids deposited thereon, and to expel the reaction mixture without unnecessary delay.

Upon being discharged from the contact surface, the reaction products travel through space and are intercepted by a refrigerated wall maintained at a temperature on the order of 0° C. The wall is preferably vertical, or nearly so, so as to assure that no substantial quantity of the reaction mixture will accumulate thereon. As the reaction mixture flows from the refrigerated wall, it is immediately conducted to a centrifugal separator wherein the spent acid is separated from the sour nitroglycerine. The centrifugal separator is preferably of small capacity and arranged close by the nitrator, so that at no time can any substantial quantity of the acid-nitroglycerine mixture be contained therein or in the pipe leading from the nitrator. If the output of the nitrator exceeds the capacity of one such separator, then a battery of such separators may be arranged in parallel to receive the output of the nitrator and assure that no back-stock will accumulate in the nitrator.

From the centrifugal separator, the sour nitroglycerine is delivered directly to a washing apparatus, where it is neutralized. From the centrifugal separator, the spent acid is returned to a storage chamber, from whence a portion of it may be utilized, after reinforcement with fresh acid, to nitrate additional glycerine, and the remainder may be reclaimed by the denitration processes commonly employed in the art.

Referring now to the accompanying flow sheet, the process will be described in detail.

From the tank 1, the glycerine is pumped through a line 2 and deposited upon a spinning disc 3 within nitrator 4. Concurrently, the acid mixture is deposited upon the spinning disc 3 from a pipe-line 5. Fresh mixed acid is maintained in a tank 6 and pumped therefrom through a cooler 7, thereafter being mixed with spent acid from tank 8. Suitable valves 50 and metering devices 51, maintained in the lines extending from the tanks 6 and 8, may be controlled to regulate the proportions in which the fresh and spent acids are mixed. Thereafter the mixture is passed through a cooler 9 and delivered to pipe 5. Likewise the glycerine line is provided with a valve and metering device, and the three metering devices may be interlocked to maintain the desired proportion of the ingredients. If desired, filters 52 may be included in the supply lines.

The rate at which the acid mixture and the glycerine are delivered to the spinning disc 3 is regulated so that approximately 4½ pounds of fresh mixed acid are delivered to disc 3 for each pound of glycerine delivered thereto.

Immediately as contact is made between the acid and the glycerine on disc 3, the reaction products are projected centrifugally therefrom and intercepted by the vertical walls of nitrator 4. These vertical walls are refrigerated as by the circulation of brine through jackets, so as to maintain the temperature on the inside of the nitrator walls at about 0° C. The nitrator 4 has a cone bottom leading to a discharge pipe 10, which delivers the reaction products to a centrifugal separator 11. The pipe 10 between the nitrator 4 and the separator 11 is preferably as short as possible consistent with convenient location of the apparatus and gravity-feed of the reaction products from the nitrator to the separator. From the separator 11, the spent acid is discharged through a line 12 to tank 8. Concurrently, the sour nitroglycerine is discharged through a line 13 into a tank 14, the movement of the nitroglycerine preferably taking place under gravity alone. Within tank 14, a washing solution is maintained at the level indicated by the dotted line. The washing medium may be water or a solution containing sodium carbonate. The contents of tank 14 are continuously agitated as by the introduction of air through a pipe 15, having a series of perforations in portion 16 thereof, maintained in the bottom of tank 14. An overflow pipe 17 is provided for maintaining a constant level of the mixture in tank 14, said overflow pipe having a vertical leg extending downwardly within the tank, so that the intake thereto is substantially below the surface of the liquid in the tank, but said vertical portion of the outlet pipe permits any nitroglycerine which may be entrained in the overflow to settle downwardly under the influence of gravity.

From the bottom of tank 14, the nitroglycerine-water emulsion is drawn off through a conduit 18 by a diaphragm pump 19 and delivered to a stand-pipe 20, the upper end of which is vented and the lower end immersed in the contents of a separator 21. The separator 21 is initially charged with water or soda solution, but, as the process proceeds, its contents approach the composition of the mixture drawn from tank 14. A constant level is maintained in separator 21 by the provision of an overflow pipe 22, which returns the overflow to tank 14. The nitroglycerine in the emulsion delivered to separator 21 settles to the bottom thereof and is collected in a leg 23, from which it is decanted through a conduit 24 and delivered through a conduit 25 to a tank 26 which is provided with a mechanical agitator 27. From a suitable source of supply, not shown, a solution consisting of two to ten per cent of sodium carbonate in water is continuously delivered through a pipe 28 to tank 26, in proportions such as to provide on the order of .01 to .09 parts of sodium carbonate for each part of nitroglycerine delivered through conduit 25. The tank 26 is arranged so that the liquid level therein is above the liquid level in tank 14, and an overflow pipe 30 is arranged to draw off the excess liquid from tank 26 and deposit it in tank 14. Tank 26 and an accompanying separator 33 are described in detail hereinafter and illustrated in Figures 4 and 5. The nitroglycerine and soda solution are delivered to the tank 26 adjacent the blades 29 of agitator 27. The agitation within tank 26 is sufficiently violent to maintain the nitroglycerine in suspension therein. Pipe 32 is provided for delivering the nitroglycerine-water emulsion from tank 26 to a separator 33. The nitroglycerine-water emulsion is forced to flow into separator 33 by an air jet 37. In vessel 33, the nitroglycerine settles to the bottom, where it collects in a leg and is decanted just as in vessel 21. The soda solution returns to vessel 26 via pipe 34 (shown for clarity as bowed, but in practice horizontal), leaving vessel 33 through opening 36 and entering vessel 26 through opening 35. The concentration of nitroglycerine in vessel 26 can be controlled over a wide range by controlling the rate of flow of the nitroglycerine-water emulsion into separator 33. It is preferred to control the rate of flow of nitroglycerine-water emulsion into vessel 33 at a rate such that the concentration of nitroglycerine in vessel 26 is approximately five to ten per cent. From the separator 33, the nitroglycerine which settles in the bottom leg thereof is decanted and, if desired, may pass through one or more additional washing stages 126 and 133, duplicating tank 26 and separator 33 for washing with soda solution or water. Ultimately the nitroglycerine is collected in a tank 38 in a solvent therefor, such as ethyl acetate or toluene, or it is delivered via a pipe line or gutter to a storage vessel located in a separate building, properly barricaded, and at a safe distance from the manufacturing building.

Figure 2:
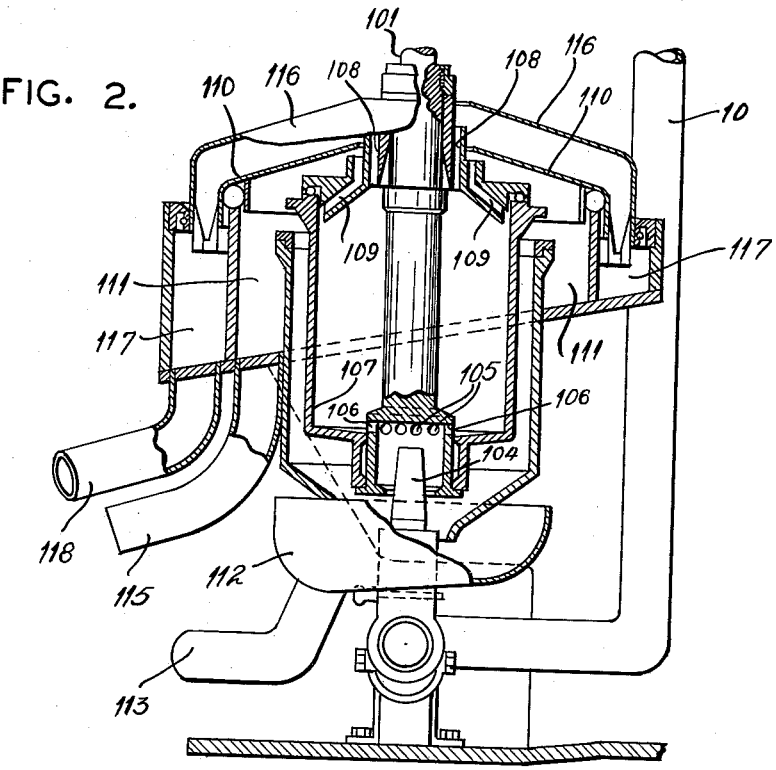
Figure 2 is a longitudinal sectional view of the centrifugal separator shown diagrammatically in Figure 1.

The centrifugal separator, shown diagrammatically at 11 in Figure 1, is preferably of character such that there can be no metal-to-metal contact of the moving parts in positions where nitroglycerine under treatment might be subjected to a mechanical blow. The centrifugal separator is also preferably designed so that, at any time, it contains not over a pound or two of nitroglycerine. A suitable centrifugal separator for the purpose is shown more in detail in Figure 2 and, although the separator per se forms no part of the present invention, it consists essentially of a motor (not shown) having a depending drive shaft 101 supporting at its bottom a centrifugal bowl 107 adapted to be rotated at speeds in the neighborhood of 3000 to 4000 revolutions per minute. The shaft 101 is centered by a suitable balancing mechanism located above the apparatus shown. The nitroglycerine emulsion is fed from pipe 10, through nozzle 104 to impinge on the surface 105, whereupon it enters by centrifugal action through the ports 106 into the bottom of the bowl 107. Due to the difference in specific gravity of the spent acid and the nitroglycerine, they separate under the centrifugal action in the bowl 107 and the spent acid leaves the bowl through the exit 109, is intercepted by a stationary hood 110, thereby directed into chamber 111, and then leaves the centrifuge through pipe 115. The nitroglycerine leaves the centrifugal bowl 107 through the exit 108, is intercepted by a stationary hood 116, is directed into chamber 117, and leaves the centrifuge through pipe 118. Surrounding the inlet pipe for the emulsion is a stationary bowl 112 which is adapted to receive the emulsion which discharges from the bowl when the machine is stopped. Such residue is then carried from the bowl 112 out through the pipe 113.

Figure 3:
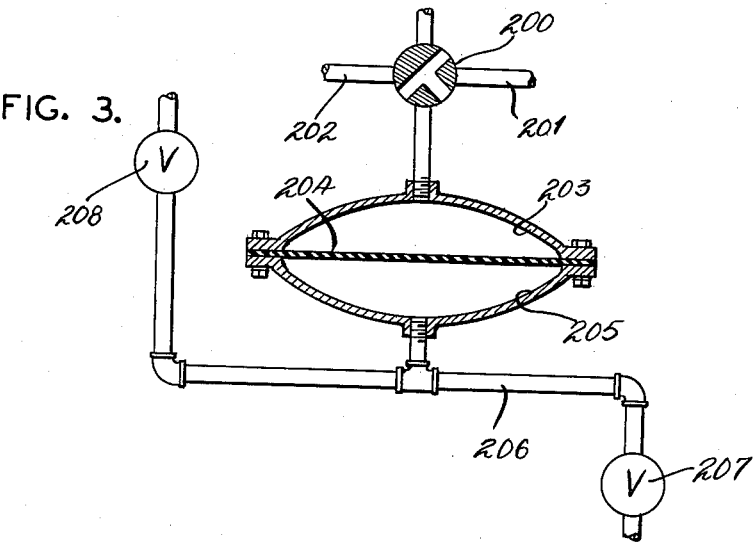
Figure 3 is a longitudinal sectional view of a diaphragm pump shown diagrammatically in Figure 1.

The pump 19, as indicated above, is preferably of the diaphragm type so as to avoid the possibility of subjecting the nitroglycerine being forced therethrough to the effects of friction between moving metal parts. While the pump per se forms no part of the present invention, a suitable pump is illustrated in Figure 3 of the drawings, and consists essentially of a three way motor-driven valve 200, which alternately applies compressed air from pipe 201 and vacuum from pipe 202 to the chamber 203. The alternate vacuum and pressure in the chamber 203 is effective to flex the diaphragm 204 which may, for instance, be of rubber, thus making the chamber 205 alternately of larger and smaller volume. When the chamber 205 is enlarged by upward movement of the diaphragm 204, the valve 207 opens and the nitroglycerine emulsion is drawn into the pipe 206, while at the same time valve 208 is automatically maintained closed. When the chamber 205 is made smaller by downward movement of the diaphragm 204, valve 207 automatically closes, valve 208 automatically opens, and an increment of the nitroglycerine emulsion is forced out through the valve 208.

Figure 4:
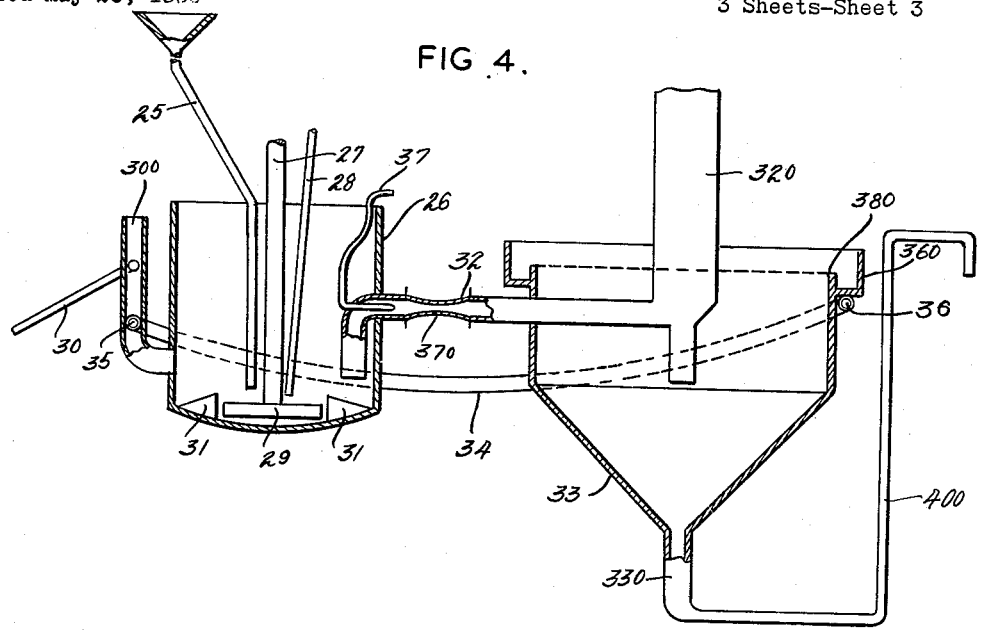
Figure 4 is a longitudinal sectional view of a washing device shown diagrammatically in Figure 1.
Figure 5:
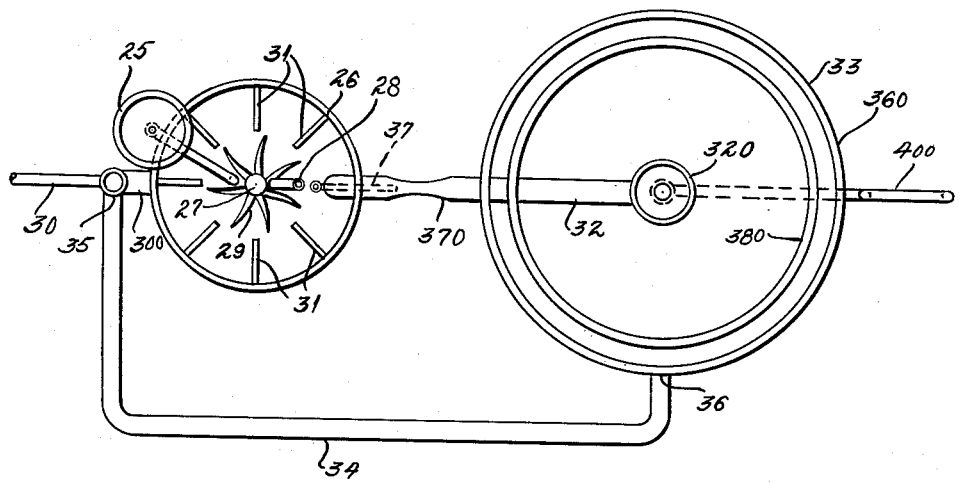
Figure 5 is a plan view of the washing device of Figure 4.

The tank 26, Figures 4 and 5, is provided with an agitator 27 driven by motor 270 and having at its bottom end an impeller 29 of a suitable type for throwing the mixture horizontally and radially outward, thus inducing circulation of the contents of tank 26 so that the flow is downward near the center and upward at the walls. A series of baffles 31 is arranged about impeller 29, extending upwardly from the bottom of tank 26. A pipe 32 connects tanks 26 and 33, and has a venturi-throat 370 at one end and a stand-pipe 320 to prevent the larger particles of nitroglycerine from leaving vessel 26. An air jet 37 is so arranged as to force air through the venturi 370 of pipe 32, so as to force the liquid from tank 26 into tank 33. Overflow from vessel 33 is returned to tank 26 through pipe 34. In the embodiment shown, the vessel 33 is provided with a launder 360 about the upper edge 380 thereof. The launder 360 receives the overflow from vessel 33 and delivers it through orifice 36 to pipe 34, from which it is delivered through orifice 35 to tank 26. Connected with pipe 34, adjacent tank 26, is a stand-pipe 300 which, at an elevation above orifice 35, is connected to overflow pipe 30, so as to provide a vertical leg in which the fluid is relatively quiescent, so that any suspended particles of nitroglycerine therein may settle and thus avoid being discharged. Tank 33 has a conical bottom with a depending leg 330 and discharge line 400. A feed line 25 for the nitroglycerine and a feed line 28 for soda solution both extend adjacent impeller 29 so as to be in the circulating stream approaching the impeller.

In starting operation of the device in washing nitroglycerine, tanks 26 and 33 are filled to the level of overflow pipe 30 with soda solution. Agitator 27 and air jet 37 are then turned on, and glycerine and soda solution are then continuously fed into the tank 26 through the lines 25 and 28, respectively.

The air jet 37 acts upon the liquid within the venturi-throat 370, causing the liquid to flow from tank 26 through pipe 32 down through stand-pipe 320 into tank 33. The air from jet 37 travels through pipe 32 to stand-pipe 320, from which it exhausts upwardly into the atmosphere. The volume of liquid in tank 33 below the stand-pipe 320 is relatively quiescent, and the nitroglycerine therein settles out into the depending leg 330, from which it is continuously discharged through pipe 400. The substantially nitroglycerine-free wash water leaves tank 33 through opening 36 into pipe 34, and back into tank 26 through opening 35. The contents of tank 26 are thus continuously circulated in a path from tank 26 to tank 33 through pipe 32, and from tank 33 through pipe 34 back to tank 26, the agitator-baffle system in tank 26 providing a zone of agitation in said path, and the tank 33 providing a quiescent zone in said path. By regulating the flow of air from jet 37 and holding the rate of feed of nitroglycerine through pipe 25 constant, it is possible to control the concentration of nitroglycerine in tank 26.

Wash water overflows and is discharged from the system through pipe 30, which has a depending leg portion 300 of sufficient length and diameter that the liquid within it is relatively quiescent, permitting nitroglycerine to settle downwardly so that essentially only wash water flows out. After the system reaches equilibrium, the nitroglycerine discharges from leg 330 at a rate equal to that at which it is added to the system from pipe 25. The wash water overflows from pipe 30 at the same rate as it is added to the system from pipe 28.

In the nitroglycerine industry it is common practice to wash in the neighborhood of about seventy parts nitroglycerine with about thirty parts wash water. With the washing device and process, described above, it is likewise possible to wash seventy parts nitroglycerine, for example, with thirty parts of wash water. The advantage is obtained with the system of the present invention, however, that during the actual washing operation a much lower concentration of nitroglycerine is maintained within the system, for example, one part of nitroglycerine to ten parts of water. This operation is made possible because of the large volume of wash water within the tanks 26 and 33 which is constantly recirculated and effectively dilutes the relatively concentrated mixture of nitroglycerine and soda solution entering the system.

From the foregoing description, it should be apparent that, when the nitroglycerine is in its most dangerous stage, i. e., while it is acidic, only small quantities thereof exist at any one locus in the system and consequently the hazard of operation is materially reduced. If an explosion did occur, it would be of localized character and with such a small quantity of nitroglycerine that the damage resulting would be relatively limited. In the operation of the process, it is desirable to isolate the washing stages from the nitration and separation stages of the process, such isolation being accomplished, for example, by the provision of reinforced concrete walls between separate rooms in the building where the process is carried out. It is also desirable to isolate the control room from the processing rooms, thus giving the operating personnel protection in the event of an explosion. It is a unique feature and advantage of this process that, because of the small quantities of nitroglycerine at any locus, it is possible and practical to provide sufficiently strong walls to protect the operating personnel in the event of an explosion in an adjacent room.

The process of the present invention is such that an increment of nitroglycerine, after being nitrated at the spinning disc 3, may be separated from the acid and deposited in the tank 14 within as short a period of time as one and a half minutes, and through separator 33 within fifteen minutes.

The yield of nitroglycerine produced by the process of the present invention is consistently about 96 per cent or better of theoretical.

From the foregoing description, those skilled in the art should readily understand the operation and advantages of the process herein disclosed. While the invention has been illustrated with particular reference to the nitration of glycerine, it is to be understood that the principles thereof are applicable at large, including, for instance, the nitration of glycols, such as ethylene glycol and diethylene glycol, and sugars in suitable dispersion, such as sucrose and glucose. Moreover, in describing the process of manufacturing nitroglycerine, it is to be understood that chemical compounds equivalent to those specifically mentioned may be utilized at any stage in the process, and consequently the reference to specific acids, alkalis, and solvents has been only by way of example and the invention is not intended to be limited thereto.

Having thus described the invention, what is claimed and desired to be secured by Letters Patent is:

1. In the art of nitrating glycerine, the process comprising feeding streams of glycerine and nitrating acid onto a warm reaction surface of a rotating plate whereby the reactants are spread in a thin sheet, mixing the glycerine and acid on the reaction surface as they move thereover, immediately discharging the reaction products from the reaction surface onto a stationary surface along which they flow in a continuous stream, maintaining the reaction products in moving stream flow, delivering said reaction products to a centrifugal separator without intervening retardation of the stream flow and neutralizing the sour nitroglycerine.

2. The process of claim 1 wherein the neutralizing step comprises continuously feeding soda solution and sour nitroglycerine directly from the separator, as it is separated, into a continuously agitated bath, continuously flowing a portion of the resulting mixture into a settling bath at a rate sufficient to transfer nitroglycerine to the settling bath at substantially the same rate that the sour nitroglycerine is fed to the agitated bath, continuously removing the nitroglycerine from said settling bath, continuously flowing the substantially nitroglycerine-free liquid from said settling bath back into said agitated bath, and continuously removing an amount of substantially nitroglycerine-free liquid from said mixture substantially equivalent to the amount of soda solution fed to the agitated bath.

3. The process of claim 1 wherein the neutralizing step comprises continuously feeding soda solution and sour nitroglycerine directly from the separator, as it is separated, into a path in one portion of which the mixture is agitated and at another portion of which the mixture is quiescent, settling the nitroglycerine from the mixture at the quiescent portion, returning the supernatent liquor to the agitated portion; continuously adding fresh nitroglycerine to the path at a rate corresponding substantially to the rate of nitration and concurrently adding fresh soda solution in predetermined relation to the rate of addition of the fresh nitroglycerine; concurrently withdrawing the settled nitroglycerine, and concurrently withdrawing liquors from the path, such withdrawals being at the same rate as the rate of additions to the path, the withdrawal of said liquors being effected vertically through a quiescent channel whereby entrained nitroglycerine may settle out of said channel and return to the path; then washing the withdrawn nitroglycerine by mixing it with water and circulating the mixture through a path in one portion of which it is agitated and in another portion of which the mixture is quiescent, settling the nitroglycerine at the quiescent portion, returning the supernatent wash mixture to the agitated portion, and separately withdrawing the settled nitroglycerine and the wash mixture at the same rate that fresh nitroglycerine and water are cumulatively introduced into the path, such withdrawal of wash mixture being effected vertically through a quiescent channel from which entrained nitroglycerine may settle and return to the path.

References Cited in the file of this patent

UNITED STATES PATENTS

| | | |
|---|---|---|
| 1,297,170 | Holley et al. | Mar. 11, 1919 |
| 1,648,367 | Spensley | Nov. 8, 1927 |
| 1,893,447 | Schmid | Jan. 3, 1933 |
| 1,901,003 | Schmid | Mar. 14, 1933 |
| 1,973,559 | Brown | Sept. 11, 1934 |
| 2,171,250 | Archibald | Aug. 29, 1939 |
| 2,192,094 | Moore | Feb. 27, 1940 |
| 2,217,263 | Waterman et al. | Oct. 8, 1940 |
| 2,254,352 | Cloud et al. | Sept. 2, 1941 |
| 2,263,534 | Aldridge | Nov. 18, 1941 |
| 2,363,834 | Crater | Nov. 28, 1944 |
| 2,405,158 | Mensing | Aug. 6, 1946 |
| 2,415,423 | Franz | Feb. 11, 1947 |
| 2,435,314 | Kokatnur | Feb. 3, 1948 |
| 2,438,244 | Biazzi | Mar. 23, 1948 |
| 2,579,474 | Crawford | Dec. 25, 1951 |
| 2,594,675 | Norell | Apr. 29, 1952 |

FOREIGN PATENTS

| | | |
|---|---|---|
| 405,349 | Great Britain | Feb. 8, 1934 |